United States Patent
Harada et al.

(10) Patent No.: US 8,571,006 B2
(45) Date of Patent: Oct. 29, 2013

(54) MOBILE COMMUNICATION METHOD AND RADIO BASE STATION

(75) Inventors: Atsushi Harada, Kawasaki (JP);
Minami Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 820 days.

(21) Appl. No.: 12/597,299

(22) PCT Filed: Apr. 24, 2008

(86) PCT No.: PCT/JP2008/057980
§ 371 (c)(1),
(2), (4) Date: Jan. 14, 2010

(87) PCT Pub. No.: WO2008/133310
PCT Pub. Date: Nov. 6, 2008

(65) Prior Publication Data
US 2010/0150086 A1    Jun. 17, 2010

(30) Foreign Application Priority Data
Apr. 24, 2007 (JP) ................................ P2007-114903

(51) Int. Cl.
*H04J 3/06* (2006.01)
*H04W 4/00* (2009.01)
*H04J 3/00* (2006.01)

(52) U.S. Cl.
USPC ............ 370/350; 370/329; 370/330; 370/345

(58) Field of Classification Search
USPC .................................................. 370/329, 350
See application file for complete search history.

(56) References Cited

U.S. PATENT DOCUMENTS

| | | | |
|---|---|---|---|
| 5,802,044 A * | 9/1998 | Baum et al. | 370/330 |
| 6,470,188 B1 * | 10/2002 | Ohtani et al. | 455/503 |
| 2006/0133522 A1 * | 6/2006 | Sutivong et al. | 375/260 |
| 2007/0184865 A1 * | 8/2007 | Phan et al. | 455/509 |
| 2010/0157885 A1 * | 6/2010 | Koyanagi et al. | 370/328 |

FOREIGN PATENT DOCUMENTS

| | | |
|---|---|---|
| JP | 2004-64419 A | 2/2004 |
| JP | 2004-187022 A | 7/2004 |

OTHER PUBLICATIONS

International Search Report with translation from PCT/JP2008/057980 dated Sep. 2, 2008 (2 pages).
Written Opinion from PCT/JP2008/057980 dated Sep. 2, 2008 (3 pages).
3GPP TSG RAN WG1 Meeting #47bis; R1-070106; "Uplink Timing Control for E-UTRA"; NTT DoCoMo et al.; Sorrento, Italy; Jan. 15-19, 2007 (2 pages).

* cited by examiner

*Primary Examiner* — Noel Beharry
(74) *Attorney, Agent, or Firm* — Osha Liang LLP

(57) ABSTRACT

In a mobile communication method by which a mobile station (UE) transmits a control signal to a radio base station (eNB) in an uplink by using an uplink dedicated resource, different methods for determining whether or not a synchronization state is established in the uplink, are used depending on whether or not the uplink dedicated resource is set up.

2 Claims, 7 Drawing Sheets

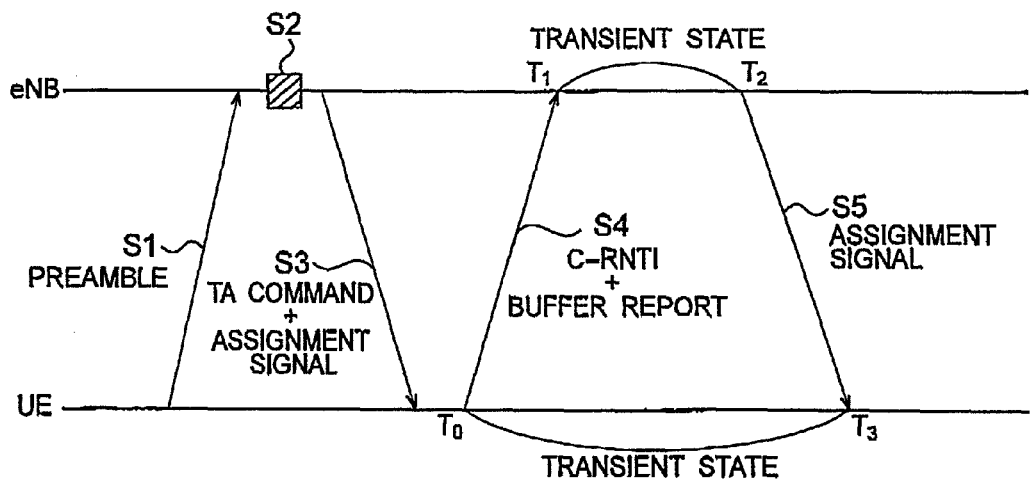

FIG. 3

| | UPLINK DEDICATED RESOURCE ||
| | SET UP | RELEASED |
|---|---|---|
| eNB | · SYNCHRONIZATION STATE<br>· OUT-OF-SYNCHRONIZATION STATE (TYPE A)<br>· OUT-OF-SYNCHRONIZATION STATE (TYPE B) | · OUT-OF-SYNCHRONIZATION STATE<br>· (SYNCHRONIZATION STATE / TRANSIENT STATE) |
| UE | · SYNCHRONIZATION STATE<br>· OUT-OF-SYNCHRONIZATION STATE | · OUT-OF-SYNCHRONIZATION STATE<br>· (SYNCHRONIZATION STATE / TRANSIENT STATE) |

FIG. 4

1. UPLINK DEDICATED RESOURCE IS RELEASED
2. CONDITION FOR SYNCHRONIZATION DETERMINATION IS NOT SATISFIED
3. TIMER HAS EXPIRED

1. RECEPTION PROCESSING ON UPLINK USER DATA IS OK (CRC) WITHOUT UPLINK DEDICATED RESOURCE BEING INCLUDED

MOBILE COMMUNICATION METHOD AND RADIO BASE STATION

TECHNICAL FIELD

The present invention relates to a mobile communication method by which a mobile station transmits a control signal to a radio base station in an uplink by using an uplink dedicated resource and relates to a radio base station.

BACKGROUND ART

In general, in a mobile communication system, transmission delays of signals from mobile stations UE at a radio base station eNB differ depending on the difference between the distances to the radio base station eNB from the respective mobile stations UE. For example, a transmission delay of a signal from a mobile station UE located at a cell edge is larger than a transmission delay of a signal from a mobile station UE located near the radio base station eNB.

In a radio access scheme such as "LTE (Long Term Evolution)" which has been promoted by the 3GPP for standardization in recent years, if timing differences of receiving signals (each being an uplink data signal, a control signal or the like) from mobile stations UE at a radio base station eNB are within a certain range (a Cyclic prefix length given to each information symbol in a radio sub-frame), the signals from the respective mobile stations UE are orthogonal to each other. Thus, it is determined that a synchronization state is established in an uplink for each mobile station UE.

Specifically, in the above radio access scheme, if an uplink dedicated resource (for example, a PUCCH: Physical Uplink Control Channel) is set up, the radio base station eNB can measure an offset between reference reception timing, and reception timing of a control signal (for example, a Sounding Reference signal, CQI information, or a Scheduling Request) transmitted from each mobile station UE by use of the uplink dedicated resource, and thus can determine whether or not a synchronization state is established in an uplink for each mobile station UE.

Non-patent Document 1: 3GPP TSG RAN WG1 Meeting #47bis R1-070106 (Jan. 15, 2007)

DISCLOSURE OF THE INVENTION

However, the radio access scheme such as LTE has the following problem. If an uplink dedicated resource (for example, a PUCCH: Physical Uplink Control Channel) is not set up, each mobile station UE cannot transmit the above described control signal (for example, a Sounding Reference Signal, CQI information, or a Scheduling Request) and the radio base station eNB cannot measure the offset between the reference reception timing, and the reception timing of the above described control signal (for example, a Sounding Reference Signal, CQI information, or a Scheduling Request). Accordingly, the radio base station eNB cannot determine whether or not a synchronization state is established in an uplink for each mobile station UE.

Therefore, the present invention was made in consideration of the above described situation, and aims to provide a mobile communication method and a radio base station which can determine whether or not a synchronization state is established in an uplink for each mobile station UE, regardless of whether or not an uplink dedicated resource is set up.

A first aspect of the present invention is summarized as a mobile communication method by which a mobile station transmits a control signal to a radio base station in an uplink by using an uplink dedicated resource, wherein different methods for determining whether or not a synchronization state is established in the uplink, are used depending on whether or not the uplink dedicated resource is set up.

In the first aspect, when the uplink dedicated resource is not set up, and when the radio base station succeeds reception processing on an uplink data signal transmitted by use of a temporarily assigned resource, it can be determined that the synchronization state is established in the uplink.

In the first aspect, when the uplink dedicated resource is set up, and when reception timing of the control signal transmitted by use of the uplink dedicated resource is consecutively out of a predetermined range for a predetermined period, it can be determined that the synchronization state is not established in the uplink.

A second aspect of the present invention is summarized as a radio base station which receives a control signal transmitted by a mobile station in an uplink by use of an uplink dedicated resource, including: a synchronization state manager unit configured to determine whether or not a synchronization state is established in the uplink, wherein different methods for determining whether or not the synchronization state is established in the uplink, are used depending on whether or not the uplink dedicated resource is set up.

In the second aspect, when the uplink dedicated resource is not set up, and when the radio base station succeeds reception processing on an uplink data signal transmitted by use of a temporarily assigned resource, the synchronization state manager unit can be configured to determine that the synchronization state is established in the uplink.

In the second aspect, when the uplink dedicated resource is set up, and when reception timing of the control signal transmitted by use of the uplink dedicated resource is consecutively out of a predetermined range for a predetermined period, the synchronization state manager unit can be configured to determine that a synchronization state is not established in the uplink.

As has been described above, the present invention is capable of providing a mobile communication method and a radio base station which can determine whether or not a synchronization state is established in an uplink for each mobile station UE, regardless of whether or not an uplink dedicated resource is set up.

BRIEF DESCRIPTION OF THE DRAWINGS

FIG. 3 is a table showing synchronization states of a radio base station and a mobile station in the mobile communication system according to the first embodiment of the present invention, the synchronization states depending on setup/release of an uplink dedicated resource.

FIG. 4 is a chart showing one example of a restarting procedure for transmitting an uplink data signal in the mobile communication system according to the first embodiment of the present invention.

BEST MODE FOR CARRYING OUT THE INVENTION (Configuration of Mobile Communication System According to First Embodiment of the Present Invention)

A configuration of a mobile communication system according to a first embodiment of the present invention will be described with reference to FIGS. 1 to 4.

Figure 1:
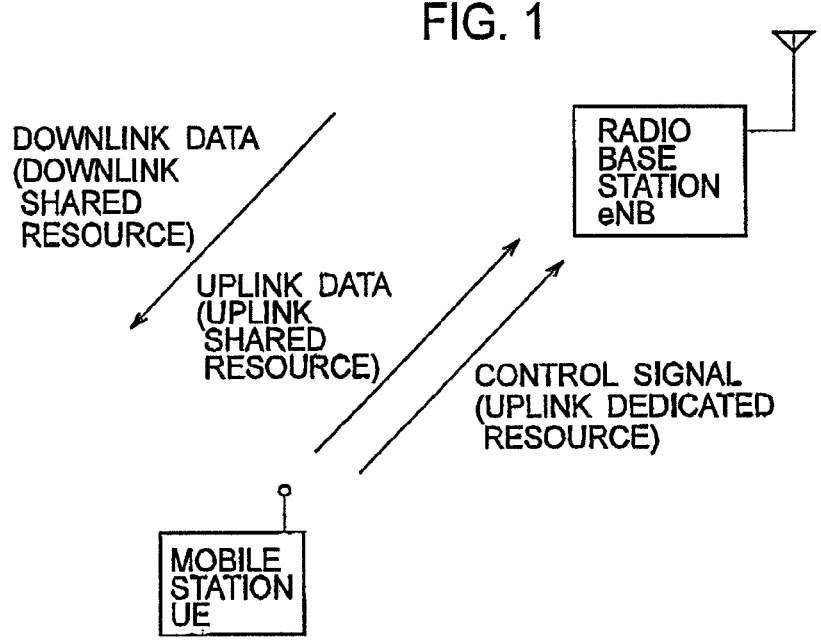
FIG. 1 is an entire configuration diagram of a mobile communication system according to a first embodiment of the present invention.

The mobile communication system according to the first embodiment includes a radio base station eNB and a mobile station UE as shown in FIG. 1.

The radio base station eNB is configured to receive an uplink data signal (for example, a user data signal) from the mobile station UE by using an uplink shared resource (for example, a UL-SCH: Uplink Shared Channel), and to receive a control signal (for example, a Sounding Reference Signal, CQI information, or a Scheduling Request) from the mobile station UE by using an uplink dedicated resource (for example, a PUCCH).

Additionally, the radio base station eNB is configured to transmit a downlink data signal (for example, a user data signal) to the mobile station UE by using a downlink shared resource (for example, a DL-SCH: Downlink Shared Channel).

The mobile station UE is configured to transmit an uplink data signal (for example, a user data signal) to the radio base station eNB by using an uplink shared resource (for example, a UL-SCH), and to transmit a control signal (for example, a Sounding Reference Signal, CQI information, or a Scheduling Request) to the radio base station eNB by using an uplink dedicated resource (for example, a PUCCH).

Additionally, the mobile station UE is configured to receive a downlink data signal (for example, a user data signal) from the radio base station eNB by using a downlink shared resource (for example, a DL-SCH).

Figure 2:
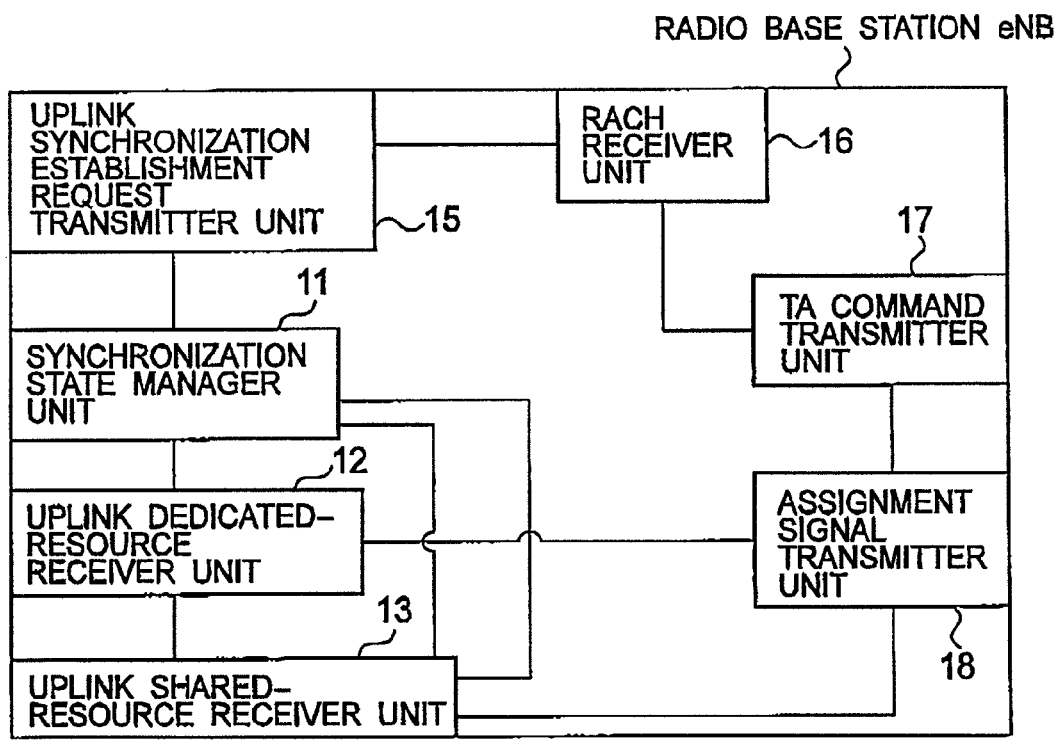
FIG. 2 is a functional block diagram of a radio base station according to the first embodiment of the present invention.

As shown in FIG. 2, the radio base station eNB according to the present embodiment includes a synchronization state manager unit 11, an uplink dedicated resource receiver unit 12, an uplink shared-resource receiver unit 13, an uplink synchronization establishment request transmitter unit 15, a preamble receiver unit 16, a TA command transmitter unit 17 and an assignment signal transmitter unit 18.

The synchronization state manager unit 11 is configured to determine whether or not a synchronization state is established in an uplink.

Here, the synchronization state manager unit 11 is configured to use different methods (determination algorithms) for determining whether or not a synchronization state is established in an uplink, for a case where an uplink dedicated resource is set up and for a case where an uplink dedicated resource is not set up.

Specifically, when an uplink dedicated resource is not set up, and when processing of receiving an uplink data signal transmitted by use of a resource temporarily assigned is successfully completed in the radio base station eNB, the synchronization state manager unit 11 determines that a synchronization state is established in an uplink.

For example, the synchronization state manager unit 11 determines that a synchronization state is established in an uplink, when the synchronization state manager unit 11 successfully completes reception processing, on an uplink data signal, which employs an error detection method such as CRC (Cyclic Redundancy Check) for the uplink data signal such as an "RRC Connection Request message", a "Handover Complete message", a "buffer report" transmitted from a mobile station UE by use of an uplink shared resource (for example, a UL-SCH) temporarily assigned to the mobile station UE.

Meanwhile, when an uplink dedicated resource is set up, and when reception timing of control signals (each being, for example, a Sounding Reference Signal, CQI information, or a Scheduling Request) transmitted by use of the uplink dedicated resource are out of a range of a receiving-side window consecutively for a predetermined period, the synchronization state manager unit 11 determines that a synchronization state is not established in an uplink.

Specific determination method (determination algorithms) in the above cases will be described later by use of FIGS. 5 to 8.

The uplink dedicated resource receiver unit 12 is configured to set up an uplink dedicated resource between itself and a mobile station UE, and to receive a control signal (for example, a Sounding Reference Signal, CQI information, or a Scheduling Request) transmitted from the mobile station UE by use of the set-up uplink dedicated resource.

The uplink shared-resource receiver unit 13 is configured to receive an uplink user data signal which is transmitted from a particular mobile station UE, by use of an uplink shared resource assigned to the mobile station UE, on a particular transmission occasion.

The uplink synchronization establishment request transmitter unit 15 is configured to transmit an uplink synchronization establishment request to a mobile station UE, when the synchronization state manager unit 11 determines that a synchronization state is not established in an uplink for the mobile station UE (that is, the mobile UE is in an out-of-synchronization state).

The preamble receiver unit 16 is configured to receive a preamble (a data series individually assigned to each mobile station UE and used for identifying the mobile station UE) transmitted from a mobile station UE, by use of an unsynchronized RACH (Random Access Channel). Note that the preamble receiver unit 16 is configured to assign a preamble to each mobile station UE, the preamble being required to be transmitted by use of the unsynchronized RACH.

The TA command transmitter unit 17 is configured to, when receiving a preamble from a mobile station UE after the uplink synchronization establishment request transmitter unit 15 has transmitted an uplink synchronization establishment request, generate a TA (Timing Advance) command for adjusting transmission timing of an uplink data signal in accordance with reception timing of the preamble of which the mobile station UE has informed.

The assignment signal transmitter unit 18 is configured to transmit an assignment signal (for example, an L1/L2 Control Channel) to each mobile station UE on a particular transmission occasion, the assignment signal assigning to each mobile station UE an uplink shared resource (for example, the UL-SCH) for transmitting an uplink data signal.

Additionally, the assignment signal transmitter unit 18 is configured to transmit an assignment signal to each mobile station UE, the assignment signal assigning to each mobile station UE a temporary uplink shared resource for transmitting a buffer report.

Note that, as shown in FIG. 3, when an uplink dedicated resource is set up, the radio base station eNB determines that anyone of a synchronization state, an out-of-synchronization state (Type A) and another out-of-synchronization state (Type B) is established in an uplink.

Additionally, when an uplink dedicated resource is not set up, the radio base station eNB determines that any one of an out-of-synchronization state and the synchronization state (transient state) is established in an uplink.

On the other hand, when an uplink dedicated resource is set up, a mobile station UE determines that any one of the synchronization state and the out-of-synchronization state is established in an uplink.

Additionally, when an uplink dedicated resource is not set up, a mobile station UE determines that any one of the out-of-synchronization state and the synchronization state (transient state) is established in an uplink.

Here, the out-of-synchronization state (Type A) indicates a state where, along with travel of a mobile station UE, reception timing of uplink data signals from the mobile station UE in the uplink has gradually changed and gone out of a certain range.

Meanwhile, the out-of-synchronization state (Type B) indicates a state where, due to a reason such as travel of a mobile station UE to a cell edge, received power of an uplink data signal is not more than a desired threshold value, thereby making it impossible to continue a communication in the uplink.

Furthermore, the synchronization state (transient state) will be described with reference to a procedure shown in FIG. 4 for restarting transmission of an uplink data signal in the mobile communication system according to the present embodiment.

As shown in FIG. 4, a mobile station UE desiring restart of transmission of an uplink data signal transmits a preamble, which is selected out of preambles in a predetermined range, to the radio base station eNB, by using unsynchronized RACH in step S1.

In step S2, the TA command transmitter unit 17 of the radio base station eNB measures an offset, from reference reception timing, of reception timing of the received preamble.

In step S3, the TA command transmitter unit 17 of the radio base station eNB transmits, as a response to the above described preamble, a TA command informing a result of the above measurement, while the assignment signal transmitter unit 18 of the radio base station eNB transmits an assignment signal for assigning a temporary uplink shared resource for transmitting an buffer report.

In step S4, in response to the measurement result of which the mobile station UE is informed through the received TA command, the mobile station UE adjusts transmission timing of an uplink data signal (and a control signal), and also transmits at the adjusted transmission timing, through a temporarily assigned uplink shared resource (for example, a UL-SCH), identifiers (C-RNTI: Cell-Radio Network Temporary Identifiers) for individually identifying mobile stations UE in a cell, and a buffer report for informing of buffer information of the foregoing mobile station UE.

In step S4, if the uplink shared-resource receiver unit 13 of the radio base station eNB successfully completes reception processing on the above described C-RNTI and buffer report, in step S5, the uplink dedicated resource receiver unit 12 of the radio base station eNB determines that synchronization in the uplink is established and sets up an uplink dedicated resource (for example, a PUCCH) for the mobile station UE, while the assignment signal transmitter unit 18 of the radio base station eNB transmits an assignment signal which assigns the uplink dedicated resource to the mobile station UE.

Here, in the radio base station eNB, a period from a time point (T1) when the above described C-RNTI and buffer report are received to a time point (T2) when the assignment signal is transmitted is in the synchronization state (transient state) which is a state where a synchronization state is established in an uplink without an uplink dedicated resource being set up.

Meanwhile, in the mobile station UE, a period from a time point (T0) when the above described C-RNTI and buffer report are transmitted to a time point (T3) when the assignment signal is received is in the synchronization state (the transient state) where a synchronization state is established in an uplink without an uplink dedicated resource being set up.

Note that a part or all of functions (modules) constituting the radio base station eNB and the mobile station UE which are shown in FIG. 2 may be configured so as to be realized by any one of a general-purpose processor, a DSP (Digital Signal Processor), an ASIC (Application Specific Integrated Circuit), a FPGA (Field Programmable Gate Array), a discrete gate, transistor logic, and a discrete hardware component or by combining any of these or the like.

Figure 11:
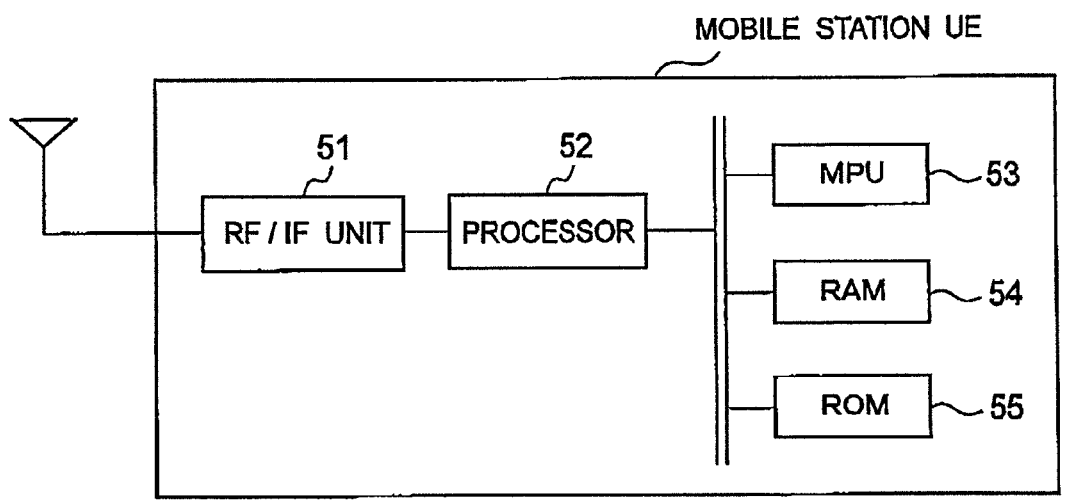
FIG. 11 is a diagram showing one example of a hardware configuration of the radio base station according to an embodiment of the present invention.

For example, description will be given by taking as an example a case where, as shown in FIG. 11, the radio base station eNB includes: an RF/IF unit 51 which performs radio signal processing; a processor 52 which performs baseband signal processing; an MPU (Micro Processing Unit) 53 which executes an application; a RAM (Random Access Memory) 54; and a ROM (Read Only Memory) 55.

In this case, the processor 52 of the radio base station eNB may realize a part or all of the functions (modules) constituting the radio base station eNB shown in FIG. 2 by being composed of: any one of a general-purpose processor, a DSP, an ASIC, a FPGA, a discrete gate, transistor logic, and a discrete hardware component, or by combining any of these or the like. Note that the mobile station UE may include a processor having the above described configuration.

Here, the general-purpose processor may be a micro processor, or may be a conventional processor, a controller, a micro controller or a state machine.

Additionally, the processor may be implemented as a combination of any computing device such as a combination of a DSP and a micro processor, a combination of plural micro processors, a combination of one or plural microprocessors and a DSP core, or the like.

(Operations of Mobile Communication System According to First Embodiment of the Present Invention)

Operations of the mobile communication system according to the first embodiment of the present invention, that is, the synchronization determination algorithms in the radio base station according to the present embodiment, will be described with reference to FIGS. 5 to 7.

Figure 5:
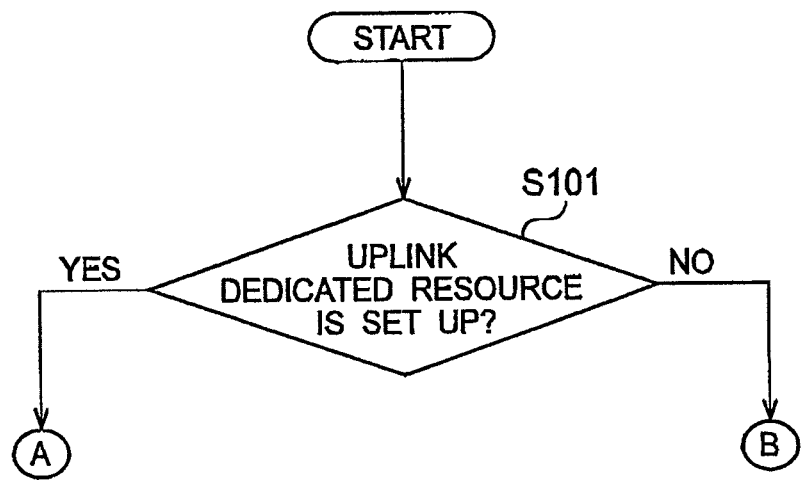
FIG. 5 is a flowchart showing an operation of the mobile communication system according to the first embodiment of the present invention.

As shown in FIG. 5, in step S101, the radio base station eNB determines at predetermined timing whether or not an uplink dedicated resource is set up for a predetermined mobile station UE. This operation proceeds to FIG. 6, when it is determined that the uplink dedicated resource is set up, whereas this operation proceeds to FIG. 7, when it is determined that the uplink dedicated resource is not set up.

Figure 6:
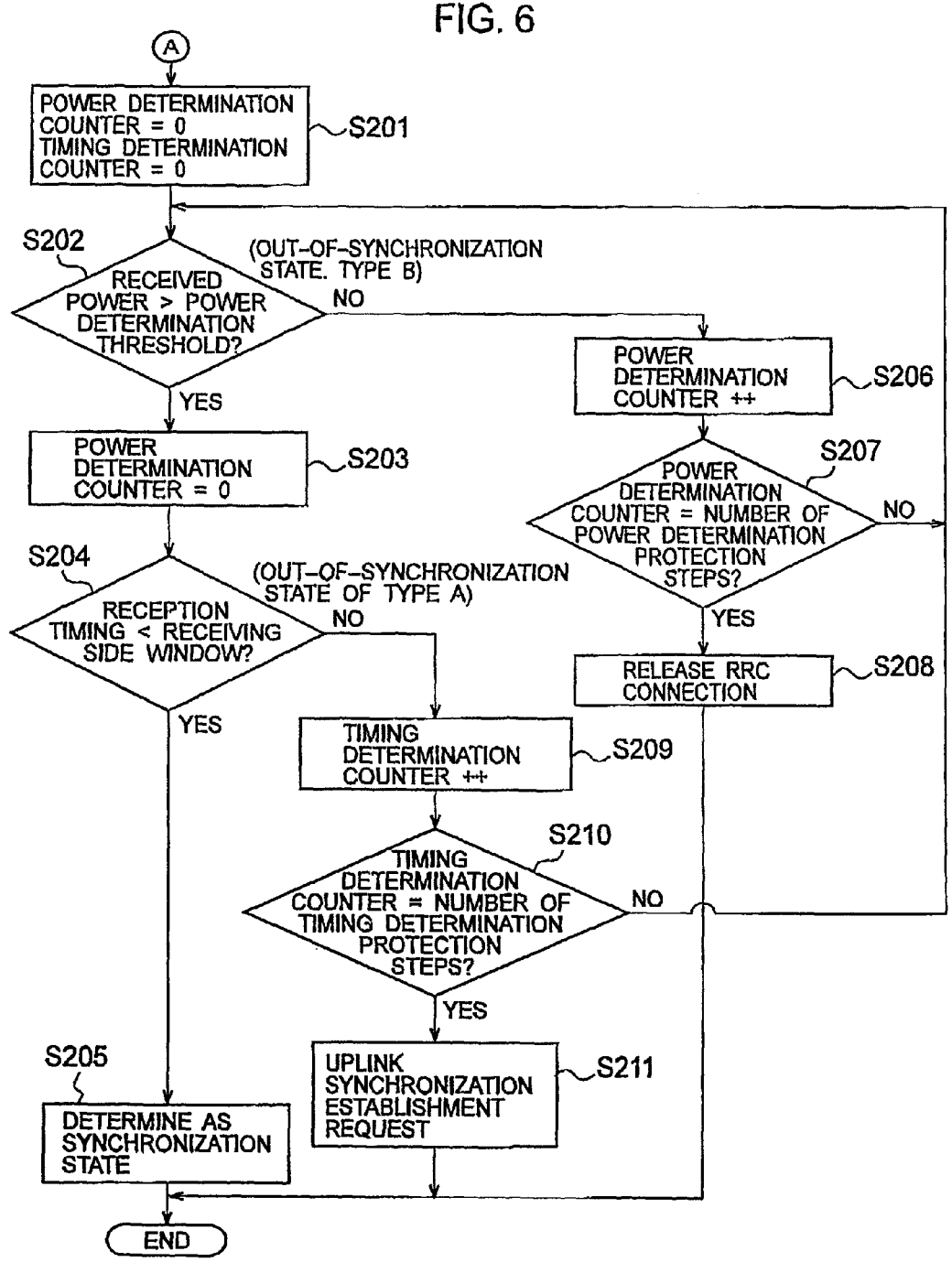
FIG. 6 is a flowchart showing an operation of the mobile communication system according to the first embodiment of the present invention.

As shown in FIG. 6, in step S201, the radio base station eNB sets both a power determination counter and a timing determination counter to "0".

In step S202, the radio base station eNB compares a received power of a control signal (for example, a Sounding Reference Signal, CQI information, or a Scheduling Request) with a power determination threshold, the control signal being transmitted from the mobile station UE by use of the uplink dedicated resource.

This operation proceeds to step S203, when it is determined that the received power of the control signal is larger than the power determination threshold value, whereas this operation otherwise proceeds to step S206, in other cases where the radio base station eNB determines that the out-of-synchronization state (Type B) is established in the uplink.

In step S203, the radio base station eNB sets the power determination counter to "0".

In step S204, the radio base station eNB compares reception timing of the above described control signal and a receiving-side window.

This operation proceeds to step S205, when it is determined that the reception timing of the above described control signal is within the receiving-side window (within a predetermined range), whereas this operation otherwise proceeds to step S209, in other cases where the radio base station eNB determines that the out-of-synchronization state (Type A) is established in the uplink.

In step 205, the radio base station eNB determines that a synchronization state is established in the uplink.

In step S206, the radio base station eNB increments the power determination counter only by "1".

In step S207, the radio base station eNB determines whether or not the power determination counter equals the number of power determination protection steps.

This operation proceeds to step S208, when it is determined that the power determination counter equals the number of the power determination protection steps, whereas this operation otherwise returns to step S202.

In step 208, the radio base station eNB releases an RRC connection.

In step S209, the radio base station eNB increments the timing determination counter only by "1".

In step S210, the radio base station eNB determines whether or not the timing determination counter equals the number of timing determination protection steps.

This operation proceeds to step S211, when it is determined that the timing determination counter equals the number of the timing determination protection steps, whereas this operation otherwise returns to step S202.

In step S211, the radio base station eNB transmits an uplink synchronization establishment request to the mobile station UE, in order to establish a synchronization state in the uplink between itself and the mobile station UE.

Figure 7:
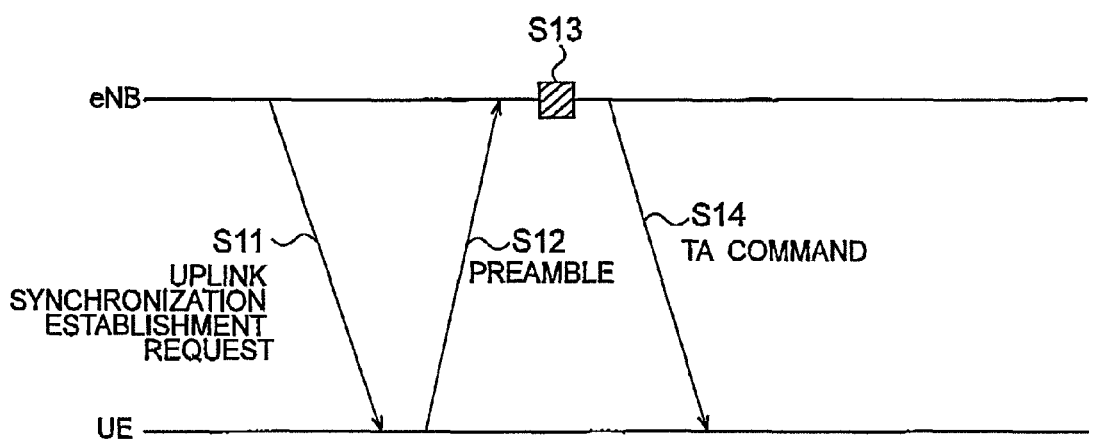
FIG. 7 is a chart showing one example of an uplink synchronization establishment procedure in the mobile communication system according to the first embodiment of the present invention.

As shown in FIG. 7, when the radio base station eNB transmits the uplink synchronization establishment request ("UL synch request") to the mobile station UE (step S11), the mobile station UE transmits a preamble by using an unsynchronized RACH in step S12, the preamble being designated by the above described uplink synchronization establishment request.

Here, the uplink synchronization establishment request may be configured not to include the preamble itself but to include an identifier which identifies the preamble.

Alternatively, the mobile station UE may be configured to use, instead of using a preamble designated by the above described uplink synchronization establishment request, a preamble randomly selected from predetermined preambles.

In step S13, the radio base station eNB measures an offset of reception timing of the received preamble from the reference reception timing.

In step S14, the radio base station eNB transmits a TA command in the form of a MAc-control-PDU, the TA command transmitting a result of the measurement. Here, the mobile station UE adjusts transmission timing of an uplink data signal (and a control signal), in accordance with the measurement result transmitted by the received TA command.

Figure 8:
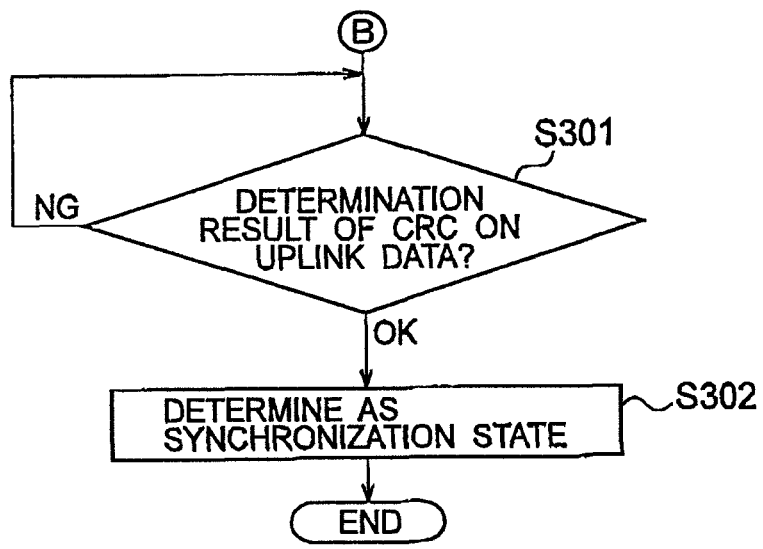
FIG. 8 is a flowchart showing an operation of the mobile communication system according to the first embodiment of the present invention.

As shown in FIG. 8, in step S301, the radio base station eNB determines whether or not reception processing using an error detection method such as CRC (Cyclic Redundancy Check) or the like is successfully completed on an uplink data signal, the error detection method being for the uplink data signal such as an "RRC Connection Request message", a "Handover Complete message", a "buffer report" or the like transmitted by use of an uplink shared resource temporarily assigned to the mobile station UE.

If the above reception processing is successfully completed, the radio base station eNB determines, in step S302, that a synchronization state is established in the uplink.

Figure 9:
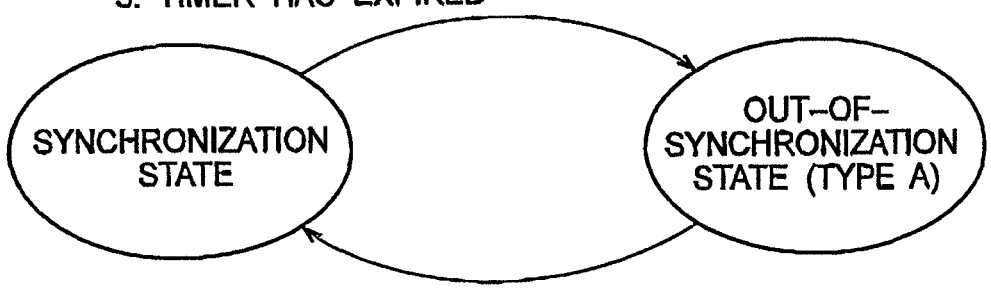
FIG. 9 is a transition diagram of synchronization states of the radio base station according to the first embodiment of the present invention.

For example, as shown in FIG. 9, when the uplink dedicated resource is released, when it is determined that the out-of-synchronization state is established in FIG. 6 (specifically, if a determination results is "YES" in step S201 in FIG. 6), or when a predetermined time period has passed without a downlink data signal being transmitted (if an Inactive timer has expired), it is determined that the radio base station eNB transitions from the "synchronization state" to the "out-of-synchronization state (Type A)".

Additionally, if the reception processing using CRC on the uplink data signal (for example, a "buffer report") transmitted by use of the temporarily assigned uplink shared resource is successfully completed without setting up the uplink dedicated resource, it is determined that the radio base station eNB transitions from the "out-of-synchronization state (Type A)" to the "synchronization state".

Figure 10:
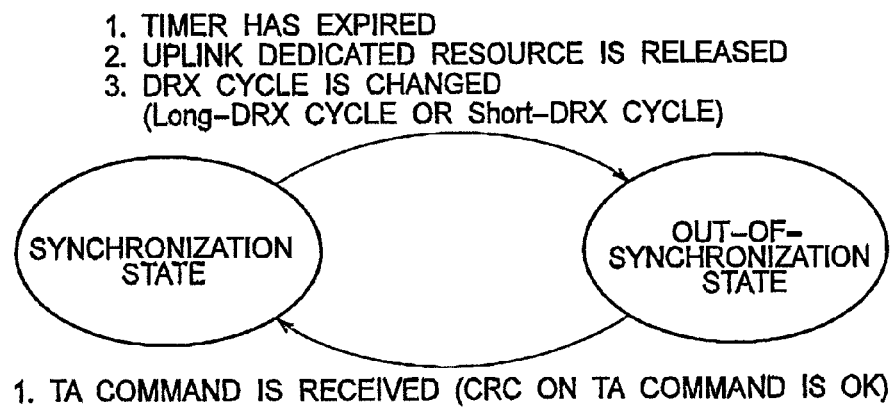
FIG. 10 is a transition diagram of synchronization states of the mobile station according to the first embodiment of the present invention.

On the other hand, as shown in FIG. 10, when the predetermined time period passes without a downlink data signal being received (when the Inactive timer has expired), when the uplink dedicated resource is released, or when a DRX cycle is changed (when a Long-DRX cycle or a Short-DRX cycle is started), it is determined that the mobile station UE transitions from the "synchronization state" to the "out-of-synchronization state".

Additionally, when, without setting up the uplink dedicated resource, the mobile station UE receives the TA command from the radio base station eNB, and successfully completes reception processing using CRC on the TA command, it is determined that the mobile station UE transitions from the "out-of-synchronization state" to the "synchronization state".

Note that the above described operations of the mobile station UE and the radio base station eNB may be implemented by hardware, may be implemented by a software module executed by a processor, or may be implemented by a combination of both.

More generally, software supporting radio protocols such as RRC, RLC, MAC and PHY are called protocol stacks (software pieces), and protocols (for example, PHY and MAC) of lower levels among those software pieces tend to be implemented into hardware in the form of semiconductor processors. Particularly in mobile stations UE, these protocols tend to be implemented into hardware in the form of semiconductor processors under the demands of miniaturization and electricity saving. Furthermore, also in small base stations (femtocells and HomeeNBs), these protocols may be implemented into hardware in the form of semiconductor processors since miniaturization and electricity saving are similarly demanded.

The software module may be provided inside a recording medium of any form, including a RAM (Random Access Memory), a flash memory, a ROM (Read Only Memory), an EPROM (Erasable Programmable ROM), an EEPROM (Electronically Erasable Programmable ROM), a register, a hard disk, a removable disk, or a CD-ROM.

In order that a processor may read and write information from and to the above recording medium, the recording medium is connected to the processor. Alternatively, the above recording medium may be integrated on the processor. Additionally, these recording medium and processor may be provided inside an ASIC. This ASIC may be provided in each of mobile stations UE and the radio base station eNB. These recording medium and processor may be provided as discrete components in each of mobile stations UE and the radio base station eNB.

(Advantageous Effects of Mobile Communication System According to First Embodiment of the Present Invention)

According to the mobile communication system of the first embodiment of the present invention, whether or not a synchronization state is established in an uplink for each mobile station UE can be determined regardless of whether an uplink dedicated resource is set up.

Although the present invention has been described in detail by use of the embodiment hereinabove, it will be apparent to those skilled in the art that the present invention is not limited by the embodiment described herein. The present invention can be implemented as corrected and modified aspects without departing from the spirit and scope of the present invention determined by description of the scope of claims. Accordingly, this description is given for the purpose of illustrative explanation, and has no restrictive implication on the present invention.

Note that entire contents of Japanese Patent Application No. 2007-114903 (filed on Apr. 24, 2007) are incorporated herein by reference.

INDUSTRIAL APPLICABILITY

As has been described above, the mobile communication method and radio base station according to the present invention can determine, regardless of whether or not an uplink dedicated resource is set up, whether or not a synchronization state is established in an uplink for each mobile station UE, and therefore, are beneficial in radio communications such as mobile communications.

The invention claimed is:

1. A mobile communication method by which a mobile station transmits a control signal to a radio base station in an uplink by using an uplink dedicated resource, comprising:
 determining whether or not a synchronization state is established in the uplink based on whether or not the uplink dedicated resource is set up, wherein
  when the uplink dedicated resource is not set up, and when the radio base station succeeds reception processing on an uplink data signal transmitted by use of a temporarily assigned resource, it is determined that the synchronization state is established in the uplink; and
  when the uplink dedicated resource is set up, and when reception timing of the control signal transmitted by use of the uplink dedicated resource is consecutively out of a predetermined range for a predetermined period, it is determined that the synchronization state is not established in the uplink.

2. A radio base station which receives a control signal transmitted by a mobile station in an uplink by use of an uplink dedicated resource, comprising;
 a synchronization state manager unit configured to determine whether or not a synchronization state is established in the uplink depending on whether or not the uplink dedicated resource is set up, wherein
 when the uplink dedicated resource is not set up, and when the radio base station succeeds reception processing on an uplink data signal transmitted by use of a temporarily assigned resource, the synchronization state manager unit is configured to determine that the synchronization state is established in the uplink; and
 when the uplink dedicated resource is set up, and when reception timing of the control signal transmitted by use of the uplink dedicated resource is consecutively out of a predetermined range for a predetermined period, the synchronization state manager unit is configured to determine that a synchronization state is not established in the uplink.

* * * * *